Dec. 13, 1960 E. E. HAHN ET AL 2,964,619

LIGHT BEAM SIGNALLING

Filed Aug. 13, 1954

X-200/227
X-325/22
X-313/112

INVENTORS
EDWIN E. HAHN &
MELVIN L. SCHULTZ
BY Charles H. Brown
ATTORNEY

United States Patent Office 2,964,619

Patented Dec. 13, 1960

2,964,619

LIGHT BEAM SIGNALLING

Edwin E. Hahn and Melvin L. Schultz, Princeton, N.J., assignors, by mesne assignments, to the United States of America as represented by the Secretary of the Navy Filed Aug. 13, 1954, Ser. No. 449,755

11 Claims. (Cl. 250—7)

This invention relates to a light beam signalling system, and more particularly, to a signalling system utilizing photoconductive semi-conductors and providing secrecy.

It is an object of this invention to provide a novel signalling system having secrecy features.

It is another object of this invention to provide novel transmitting and receiving terminal equipments useful in signalling systems.

It is a further object to provide a novel means for modulating a light beam.

In one aspect, the invention comprises a signalling system including at the transmitting end a first photoconductive semiconductive wafer made of a material such as germanium or silicon. Light from a source is directed thru said wafer towards the receiving point. The source of light provides a band of wavelengths including those at which the wafer changes from a transparent to an absorptive condition. The wafer is characterized in that its transparency characteristic in terms of wavelengths of light varies with the temperature of the wafer. An electrical signal is passed thru the wafer to vary its temperature by means of Joule heating, and to thus vary its transparency characteristic. The amount of light of predetermined wavelengths directed towards the receiving point is thus modulated in accordance with the electrical input signal.

A second wafer of the same material at the receiving point receives the modulated light from the transmitting terminal. The wafer at the receiving terminal is of the same material as the wafer at the transmitting terminal. The receiving wafer, being of the same material as the transmitting wafer, is characterized in that its relative photoconductivity in terms of wavelengths of light is complementary to the relative transparency of the transmitting wafer. Therefore, it is only light having a relatively limited range of wavelengths that is effective in varying the conductivity of the receiving wafer. Means are provided for translating the variations in conductivity of the receiving wafer to an output signal.

These and other objects and aspects of the invention will be apparent to those skilled in the art from the following more detailed description taken in conjunction with the appended drawings, wherein.

Figure 1:
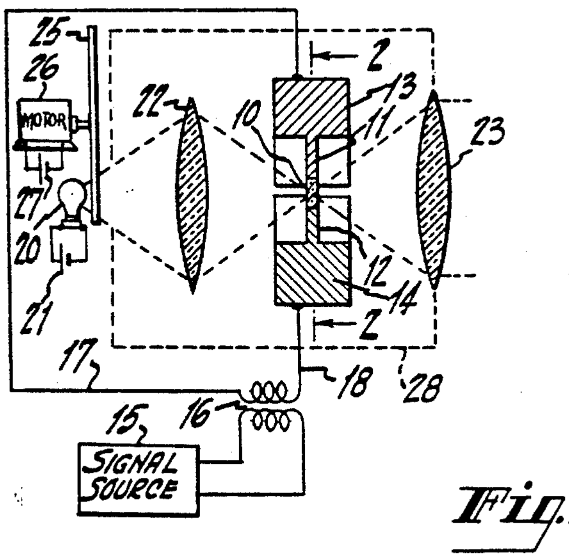
Figure 1 is a diagram of a transmitting terminal of a signalling system constructed according to the teachings of the invention.
Figure 2:
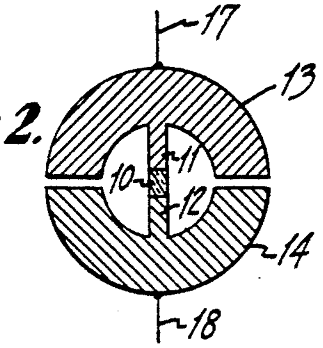
Figure 2 is a sectional view taken on the line 2—2 of a portion of the equipment in Figure 1.

Referring to Figures 1 and 2 for a description of the transmitting terminal, a wafer 10 is made of a photoconductive semi-conductor such as germanium or silicon. The wafer may be square with side dimensions in the order of a sixteenth of an inch and with a thickness in the order of 0.004 inch. The wafer 10 is mounted by means of electrically conductive supports 11 and 12 between two relatively massive electrically conductive members 13 and 14. Current from an electrical signal source 15 is applied thru a coupling transformer 16, and leads 17 and 18 to the members 13 and 14. A current is thus made to flow thru the wafer 10 in proportion to the amplitude of the signal from source 15.

A light source 20 supplied with energy from a battery 21 provides light which is directed by means of a focusing element 22 to the wafer 10. The light passing thru the wafer 10 is received by a second focusing element 23 and directed as a beam towards the receiving terminal shown in Figure 3. If the wafer 10 is made of germanium, the light source 20 may be an ordinary tungsten filament incandescent bulb. The desired light from the source 20 will be in the infra-red region having a wavelength in the order of 1.5 microns. A tungsten filament lamp delivers a large amount of light in this region. Visible light does not pass thru the wafer 10. The focusing elements 22 and 23 may be lenses, or if the wavelengths of light employed cannot be conveniently focused by means of lenses, focusing reflectors may be used.

Figure 3:
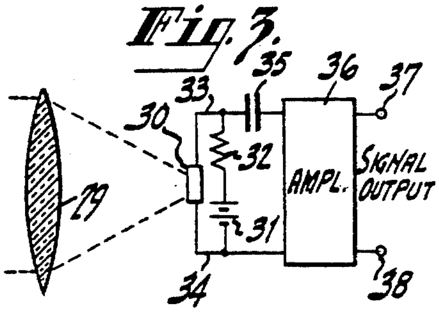
Figure 3 is a diagram of a receiving terminal for use with the transmitting terminal of Figure 1.

A chopper disc 25 driven by a motor 26 supplied with electrical energy from the battery 27 may be interposed at any point between the light source 20 and the receiving wafer in the receiving terminal shown in Figure 3. The dashed line 28 represents an enclosure which may be employed to insulate the wafer 10 from temperature fluctuations resulting from air currents.

Referring to the receiving terminal shown in Figure 3, the modulated light from the transmitting terminal is concentrated by means of a focusing element 29 onto a receiving wafer 30. The wafer 30 is preferably made of the same material as the transmitting wafer 10, and may have dimensions of the same order. Direct current is passed thru the wafer 30 from a battery 31 in series with a resistor 32. As the light falling on the wafer 30 varies, the conductivity of the wafer 30 varies, with the result that a corresponding variable or alternating current signal is developed across leads 33 and 34. This alternating current signal is coupled by means of coupling capacitor 35 to an amplifier 36 having signal output terminals 37 and 38.

Figure 4:
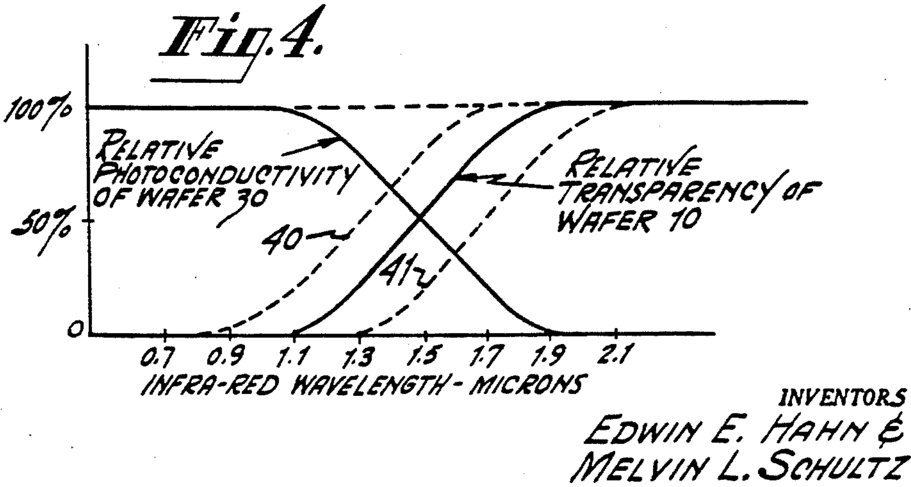
Figure 4 is a chart illustrating certain characteristics of the photoconductive semi-conductive materials employed in the system. The chart will be referred to in explaining the operation of the system.

Figure 4 is a chart illustrating certain characteristics of germanium which form the basis for the operation of the signalling system. Other photoconductive materials have similar characteristics with different values on the abscissa of the chart for wavelengths at which the material exhibits complementary transparency and photoconductivity characteristics.

The chart of Figure 4 shows that germanium is opaque to light having wavelengths less than 1.3 microns, and that germanium is substantially transparent to light having wavelengths greater than about 1.7 microns. The chart also shows that germanium is relatively non-photoconductive when light of wavelengths greater than 1.7 microns impinges thereon, and is relatively photoconductive when light having wavelengths less than 1.3 microns impinges thereon. The curve for relative transparency and the curve for relative photoconductivity are substantially mirror images of each other, that is, complementary to each other. This is due to the fact that light of wavelengths greater than 1.7 microns is transmitted directly thru the germanium, whereas energy having wavelengths less than 1.3 microns is absorbed to cause a transition of current carriers in the germanium which results in increased electrical conductivity.

The curve of relative transparency of wafer 10 in terms of wavelengths of light shifts in accordance with the temperature of the wafer 10. The dotted line curve 40 represents the characteristic at a lower temperature, and the dotted line curve 41 represents the characteristics at a higher temperature.

In the operation of the signalling system, variations in the amplitude of the electrical signal from source 15 cause a corresponding change in the temperature of the wafer 10. When the instantaneous amplitude of the applied signal is high, the temperature of the wafer 10 is high, and the relative transparency of the wafer 10 may have the characteristics represented by dotted line 41 in Figure 4. Conversely, when the instantaneous amplitude of the signal from source 15 is low, the current thru wafer 10 is low and the temperature therefore falls so that the relative transparency characteristic may appear as shown by dotted line 40 in Figure 4. The supports 11 and 12 for the wafer 10 are made of a highly conductive material such as copper so that there is practically no heat generated in the supports themselves. The massive members 13 and 14 have a size such as to possess a very large thermal inertia to provide a temperature reference about which the temperature of the wafer 10 is varied in accordance with the electric current passing therethru. The design of the mount for the wafer 10 and all parts within the enclosure 28 should take into account the factorss influencing the thermal inertia of the assembly so as to permit the handling of the desired signal frequency components. Thermal inertia is the limiting factor in determining the maximum frequency components which can be transmitted. The enclosure 28 may be evacuated, or may include gas at a predetermined pressure in accordance with design considerations effecting the desired degree of thermal inertia.

It will be noted from Figure 4 that when the wafer 10 is hot, the relative transparency curve 41 of wafer 10 overlaps the relative photoconductivity curve of wafer 30 by a small triangular area. Conversely, when wafer 10 is cool, the relative transparency curve 40 of wafer 10 overlaps the curve of relative photoconductivity of receiving wafer 30 to a large extent. Therefore, the conductivity of the receiving wafer 30 varies by a large percentage in accordance with the temperature of the transmitting wafer 10. This result follows from the fact that the transmitting wafer 10 and the receiving wafer 30 are made of the same material so that the transparency and photoconductivity characteristics are complementary to each other. A receiver having a wafer 30 of a different material from the transmitting equipment would have a different relative photoconductivity curve, and therefore could not detect the transmitted signal.

The signalling system of this invention provides a high degree of secrecy for the reason that there is a very slight percentage modulation of the total amount of light transmitted from the transmitting terminal to the receiving erminal. In the absence of a special receiving equipment such as is shown in Figure 3, the slight percentage variation in the amount of light transmitted cannot be detected. Furthermore, even if an unauthorized person has a proper receiving equipment, the material used for the transmitting wafer 10 and the receiving wafer 30 can be changed according to a pre-arranged schedule so as to frustrate the attempts of an unauthorized person from receiving the transmitted message or signal. There are a considerable number of photoconductive materials of which the wafers 10 and 30 may be constructed. A transmission can be detected only if the receiving equipment has a wafer 30 of the same material as the transmitting wafer 10.

The amount of light reaching the receiving wafer 30 is not of sufficient magnitude to cause any variation in the temperature of the receiving wafer 30. The receiving wafer 30 solely changes in its degree of photoconductivity in accordance with the quantity of light received having a wavelength below about 1.7 microns to which it is responsive. The example given is for germanium.

If the signal source 15 supplies a signal which is either on or off, such as a Morse code signal, and if amplifier 36 at the receiving terminal is an alternating current amplifier, it may be necessary to modulate the light beam at some point at a constant predetermined frequency. The frequency selected, may, for example, be 500 cycles per second. The modulation of the light beam in this manner may be accomplished by means of a chopper wheel 25 driven by a motor 26. The amplifier 36 is then tuned to be most responsive at a frequency of 500 cycles per second. If the signal supplied by the source 15 is a varying signal, such as an audio signal, the chopper wheel 25 is not required. Similarly, the chopper wheel 25 is not required if the receiving amplifier 36 is a direct current amplifier, that is, one which amplifies frequencies down to and including zero cycles per second. A stable direct current amplifier is relatively more complicated and less satisfactory by comparison with an alternating current amplifier.

The operation of the invention as thus far described has assumed the use of a light source 20 which provides light at wavelengths extending over a considerable range including the wavelengths at which the wafer 10 exhibits a transition from transparency to absorption. According to another mode of operation, the light source 20 may be a line source, that is, a source providing light of a single wavelength or a very narrow range of wavelengths. The wavelengths supplied by the line source 20 should be limited to the wavelengths at which the wafer 10 exhibits a transition from a transparency to an absorption characteristic. In this mode of operation, the temperature changes produced in the wafer 10 in accordance with the signal from source 15 may cause a modulation of all of the light from the soucre 20. Since the modulation is not limited to only a portion of the light from the source 20 having a predetermined narrow range of wavelengths, any receiving equipment sensitive to light having the wavelength of light supplied by the source 20 can intercept and detect the modulation. Therefore, a system including a line source 20 of light does not provide the same degree of security or secrecy that the previously described system provides.

It is apparent that there is provided according to this invention a novel and improved means for modulating a light beam, and that there is also provided a novel secrecy signalling system for use between two points in line of sight with each other.

What is claimed is:

1. A light beam modulating system comprising, in combination, a wafer constructed of a photoconductive semiconductive material having a transparency characteristic in terms of wavelengths of light which varies with the temperature of said wafer, a source of light having a band of wavelengths including the range of wavelengths at which said wafer changes from a transparent to an absorptive condition according to the temperature of said wafer, means to direct said light onto said wafer, a source of electrical signal energy of varying amplitude, means to vary the temperature of said wafer according to the amplitude of said signal energy to cause the particular wavelengths in said range at which said wafer changes from a transparent to an absorptive condition to vary according to the variations in said temperature, the relative transparency of said wafer to said band of wavelengths being varied accordingly.

2. A light beam modulating system as claimed in claim 1 and wherein said light source is a line source providing a narrow range of wavelengths limited to said range of wavelengths at which said wafer exhibits a transition from the transparent to the absorptive condition.

3. A light beam modulating system as claimed in claim 1 and wherein said material is germanium.

4. A light beam modulating system as claimed in claim 1 and wherein said material is silicon.

5. A signalling system comprising, in combination, a first wafer of semiconductor material having a transparency characteristic in terms of wavelengths of light which varies with the temperature of said wafer, a source of light having a band of wavelengths including the range of wavelengths at which said wafer changes from a transparent to an absorptive condition according to the temperature of said wafer, means to direct said light to said wafer, a source of an electrical signal of varying amplitude, means connected to said source to vary the temperature of said wafer according to the amplitude of said signal to cause the particular wavelengths in said range at which said wafer changes from a transparent to an absorptive condition to change according to the change in the temperature of said wafer, the relative transparency of said wafer to said band of wavelengths being varied accordingly, a second wafer of the same material as said first wafer disposed in the path of light passed through said first wafer, the conductivity of said second wafer varying according to the change in the wavelengths of the light received thereby, and means connected to said second wafer to translate the variation in conductivity of said second wafer to an output signal.

6. A secrecy signalling system comprising, in combination, a wafer of only one type of semiconductive material having a transparency characteristic in terms of wavelengths of light which varies with the temperature of said wafer, a source of light having a band of wavelengths including the range of wavelengths at which said wafer changes from a transparent to an absorptive condition according to the temperature of said wafer, means to direct said light from said source to said wafer, a source of an electrical signal of varying amplitude, means connected to said source to vary the temperature of said wafer by Joule heating according to the amplitude of said signal to cause the particular wavelengths in said range at which said wafer changes from a transparent to an absorptive condition to change according to the change in the temperature of said wafer, the relative transparency of said wafer to said band of wavelengths being varied accordingly, a second wafer of the same material as said first wafer disposed in the path of the light passed through said first wafer, the conductivity of said second wafer varying according to the change in the wavelengths of the light received thereby, and means including an amplifier connected to said second wafer to translate the variation in conductivity of said second wafer to an output signal.

7. A secrecy signalling system as claimed in claim 6 and wherein said source of light is a tungsten filament incandescent bulb.

8. A secrecy signalling system as claimed in claim 6 and wherein said source of light has a broad band of wavelengths including said range of wavelengths as a portion of said band.

9. A secrecy signalling system as claimed in claim 6 and wherein said wafer is of a thickness less than .0004 inch.

10. A secrecy signalling system as claimed in claim 6 and wherein said material is germanium.

11. A secrecy signalling system as claimed in claim 6 and wherein said material is silicon.

References Cited in the file of this patent

UNITED STATES PATENTS

| | | |
|---|---|---|
| 2,416,215 | Rath | Feb. 18, 1947 |
| 2,692,950 | Wallace | Oct. 26, 1954 |
| 2,776,367 | Lehovec | Jan. 1, 1957 |

OTHER REFERENCES

"Injected Absorption in Germanium" by A. F. Gibson Proceedings of the Physical Society of London, July 1, 1953; pages 588–596.